(12) United States Patent
Mamba et al.

(10) Patent No.: US 12,049,420 B2
(45) Date of Patent: Jul. 30, 2024

(54) PROCESS FOR TREATING ACID MINE DRAINAGE

(71) Applicant: UNIVERSITY OF SOUTH AFRICA, Pretoria (ZA)

(72) Inventors: Bhekie Brilliance Mamba, Roodepoort (ZA); Kebede Keterew Kefeni, Pretoria (ZA)

(73) Assignee: University of South Africa, Pretoria (ZA)

( * ) Notice: Subject to any disclaimer, the term of this patent is extended or adjusted under 35 U.S.C. 154(b) by 0 days.

(21) Appl. No.: 17/642,501

(22) PCT Filed: Sep. 14, 2020

(86) PCT No.: PCT/IB2020/058510
§ 371 (c)(1),
(2) Date: Mar. 11, 2022

(87) PCT Pub. No.: WO2021/048827
PCT Pub. Date: Mar. 18, 2021

(65) Prior Publication Data
US 2022/0411302 A1    Dec. 29, 2022

(30) Foreign Application Priority Data
Sep. 13, 2019    (ZA) .................................. 2019/06052

(51) Int. Cl.
| | | |
|---|---|---|
| C02F 9/00 | (2023.01) | |
| B01J 20/06 | (2006.01) | |
| B01J 20/28 | (2006.01) | |
| B01J 20/30 | (2006.01) | |

(Continued)

(52) U.S. Cl.
CPC ................ *C02F 9/00* (2013.01); *B01J 20/06* (2013.01); *B01J 20/28007* (2013.01); *B01J 20/28009* (2013.01); *B01J 20/3078* (2013.01); *C01G 49/06* (2013.01); *C02F 1/02* (2013.01); *C02F 1/281* (2013.01); *C02F 1/5236* (2013.01); *C02F 1/66* (2013.01); *C02F 1/727* (2013.01); *C01P 2002/72* (2013.01); *C01P 2002/82* (2013.01); *C01P 2002/85* (2013.01); *C01P 2002/88* (2013.01); *C01P 2004/03* (2013.01);

(Continued)

(58) Field of Classification Search
None
See application file for complete search history.

(56) References Cited

U.S. PATENT DOCUMENTS

| | | | | |
|---|---|---|---|---|
| 7,622,423 B1 * | 11/2009 | Hu | ........................... | B01J 20/06 |
| | | | | 423/493 |
| 2004/0112842 A1 * | 6/2004 | Depelsenaire | ...... | C04B 18/0436 |
| | | | | 210/749 |

OTHER PUBLICATIONS

Akhbarizadeh et al. (Mine Water Environ, 2014, 33, 89-96). (Year: 2014).*

(Continued)

*Primary Examiner* — Clare M Perrin
(74) *Attorney, Agent, or Firm* — BakerHostetler (57) ABSTRACT

This invention relates to a process for treating acid mine drainage (AMD). The process includes the steps of adjusting the pH of the AMD to be in the range of 3 to 5; adding maghemite nanoparticles to form a slurry; and a) aerating the slurry obtained in step 3), or b) simultaneously heating and mixing the slurry obtained in step 3). Thereafter maghemite nanoparticles loaded with one or more metals and sulphate and precipitated metals is separated from the slurry.

23 Claims, 8 Drawing Sheets

(51) Int. Cl.
    *C01G 49/06*     (2006.01)
    *C02F 1/02*     (2023.01)
    *C02F 1/28*     (2023.01)
    *C02F 1/52*     (2023.01)
    *C02F 1/66*     (2023.01)
    *C02F 1/72*     (2023.01)
    *C02F 1/00*     (2023.01)
    *C02F 1/74*     (2023.01)
    *C02F 101/10*     (2006.01)
    *C02F 101/20*     (2006.01)
    *C02F 101/22*     (2006.01)
    *C02F 103/10*     (2006.01)

(52) U.S. Cl.
    CPC ...... *C01P 2004/64* (2013.01); *C01P 2006/42* (2013.01); *C02F 1/001* (2013.01); *C02F 1/74* (2013.01); *C02F 2101/101* (2013.01); *C02F 2101/103* (2013.01); *C02F 2101/206* (2013.01); *C02F 2101/22* (2013.01); *C02F 2103/10* (2013.01)

(56) References Cited

OTHER PUBLICATIONS

Nordstrom et al. (Environ. Sci. Technol., 2000, 34, 254-258). (Year: 2000).*
Maila et al. (Water SA, 2014, 40, 521-528). (Year: 2014).*
Hubbard et al. (Chemical Geology, 2009, 265, 321-334). (Year: 2009).*
Wang et al. (Bioresource Technology, 2013, 146, 799-802). (Year: 2013).*
Gilbert et al. (Mine Water and the Environment, 2019, 38, 617-631). (Year: 2019).*
Michalkova et al. (Pol. J. Environ. Stud., 2013, 22, 1111-1118). (Year: 2013).*
Akhbarizadeh et al, Competitive Removal of Metals from Wastewater by Maghemite Nanoparticles: A Comparison Between Simulated Wastewater and AMD, Mine Water Environ (2014) 33:89-96.
Etale et al, Application of maghemite nanoparticles as sorbents for the removal of Cu(II), Mn(II) and U(VI) ions from aqueous solution in acid mine drainage conditions, Appl Water Sci (2016) 6:187-197.
Linnikov et al, Precursor synthesis of maghemite and its adsorption properties with respect to bivalent copper ions, Adsorption (2018) 24:629-636.
Darezereshki, Synthesis of maghemite ($\gamma$-Fe2O3) nanoparticles by wet chemical method at room temperature, Materials Letters 64 (2010) 1471-1472.
International Preliminary Report on Patentability (IPRP) issued in parent PCT/IB2020/058510 on Aug. 9, 2021.
International Search Report (ISR) issued in parent PCT/IB2020/058510 on Nov. 16, 2020.

\* cited by examiner

PROCESS FOR TREATING ACID MINE DRAINAGE

CROSS-REFERENCE TO RELATED APPLICATIONS

This application is a U.S. National Phase Application under 35 U.S.C. 371 of International Patent Application No. PCT/IB2020/058510, filed Sep. 14, 2020, which claims priority to South African Patent Application No. 2019/06052, filed Sep. 13, 2019, the entire disclosures of which are incorporated herein by reference in their entireties.

BACKGROUND TO THE INVENTION

This invention relates to a process for treating acid mine drainage.

Acid mine drainage (AMD) poses severe environmental and health problems, thus looking for the best treatment options is a global concern. One of the major sources of AMD generation is oxidation of pyrite ($FeS_2$) and other iron bearing sulphide ores, when exposed to oxygenated water and micro-bacteria [1-5]. The overall reaction for the oxidation of $FeS_2$ in the presence of air and water can be summarised by reaction (1) below. Whereas, the complete oxidation of $FeS_2$ in the presence of ferric, air and water, which is deemed faster reaction is represented by reaction (2) below [2].

$$FeS_2 + 15/2 O_2 + 7/2 H_2O \rightarrow Fe(OH)_3 + 2SO_4^{2-} + 4H^+ \quad (1)$$

$$FeS_2 + 14Fe^{3+} + 8H_2O \rightarrow 15Fe^{2+} + 2SO_4^{2-} + 16H^+ \quad (2)$$

Due to its high acidity, AMD accelerates the dissolution of several toxic metals from rocks containing different minerals [6]. Overall, AMD is characterised with low pH, high metals and sulphate concentration, and usually not only corrosive but also extremely toxic [7,8]. There are several treatment options, of which neutralisation using alkaline industrial chemicals such as calcium hydroxide and limestone are more popular for the removal of metals through metal hydroxide precipitation and sulphate as gypsum, which is a skeleton of sludge builder in AMD [9-11]. However, since both metals and sulphate are simultaneously precipitate together, with large sludge volume, it is not cost effective to recovery either the metal hydroxides or sulphate from the sludge [12]. The produced sludge are commonly disposed in landfill sites and form enormous tailing, which is also a cause of concern for an environmental pollution due to leaching of metals from the tailings. Several researches are available that state about the impacts of toxic metals and acidity on health of human being, the environment and ground water quality [13-16]. Therefore, cost effective AMD treatment technology is demanded, where recovery and reuse of valuable resources are possible.

The existing methods of AMD treatment didn't reach the expected remediation options, there is no best treatment options available as there are variations exist in AMD types with wide differences in metals and sulphate concentrations [4,17]. Therefore, it is imperative to look for different cost effective treatment options.

It is accordingly an object of the invention to provide an alternative method for treating acid mine drainage using maghemite nanoparticles that will, at least partially, alleviate the above disadvantages.

SUMMARY OF THE INVENTION

According to the invention there is provided a process for treating acid mine drainage (AMD), typically comprising of sulphate and one or more metal ions such as aluminum, arsenic, calcium, chromium, cobalt, copper, iron, magnesium, manganese, sodium, nickel, lead, antimony and zinc, wherein the process comprises the following steps:
1. providing an AMD, typically having a pH of <2;
2. adjusting the pH of the AMD to be in the range of 3 to 5, typically 4 to about 5, preferably about 5, with a base such as magnesium bicarbonate, magnesium oxide, sodium hydroxide or ammonium hydroxide, preferably 25% ammonium hydroxide solution;
3. adding maghemite nanoparticles to form a slurry; and
4. a) aerating, typically via compressed air or pure oxygen, the slurry obtained in step 3), or
   b) simultaneously heating and mixing the slurry obtained in step 3), preferably at a temperature of 50° C. to 70° C., typically about 60° C., and mixing speed of 200 to 300 rpm, typically about 250 rpm; and
5. separating a solution and maghemite nanoparticles loaded with one or more metals and sulphate and precipitated metals from the slurry.

The maghemite nanoparticles have an average particle size measured using XRD of 40 to 50 nm, typically about 48 nm.

The solution and maghemite nanoparticles and precipitated metals may be separated via filtration or alternatively, after the precipitates settled well, all the precipitated metals along with maghemite nanoparticles can be separated by decantation from the solution.

Optionally, the maghemite nanoparticles loaded with one or more metals and sulphate obtained in step 5, can be stabilized by calcination.

The maghemite nanoparticles may be synthesized by contacting an industrial magnetite with air or sintering magnetite obtained from AMD, typically from about 150° C. to about 250° C. under aeration for 3 to 6 hours.

A mass ratio of maghemite:Fe in the AMD may be from about 1:2 to 1:1, preferably about 1:2.

The heating and mixing in step 4 b) may occur for at least 2 hours.

Advantageously, the sulphate ions and one or more metal ions, such as iron, are removed from AMD simultaneously.

The slurry may comprise of one or more precipitated metals, maghemite, one or more metals and/or sulphate are adsorbed on the surface of the maghemite or precipitated sludge/slurry, one or more metals and sulphate are incorporated into the maghemite or sludge.

The solution separated at Step 5 typically comprises water, lower concentration of sulphate and metals not removed from AMD, such as calcium and magnesium metal ions.

Sulphate residue left after treatment may be removed by treating using soluble salts of barium or barium hydroxide in the form of barium sulphate precipitate without any pH change and can be reused for different application.

Sulphate residue left after treatment may be removed by treating using soluble salts of barium or barium hydroxide in the form of barium sulphate precipitate without any pH change and can be reused for different application.

The one or more metals removed from the AMD may be aluminum, arsenic, calcium, cobalt, copper, iron, magnesium, manganese, sodium, nickel, lead, antimony and zinc, manganese, copper, nickel, cobalt and zinc metal ions.

Sludge obtained from AMD in the presence of maghemite are well responding to the external magnetic field. This makes the sludge recovered industrially important.

BRIEF DESCRIPTION OF THE DRAWINGS

FIG. 4 A) is a scanning electron microscope (SEM) image of Energy Dispersive X-Ray Spectroscopy (EDX) surface elemental composition of $\gamma$-Fe$_2$O$_3$ nanoparticles;

FIG. 4 B) is an SEM image of SEM-EDX elemental mapping of $\gamma$-Fe$_2$O nanoparticles corresponding to a rectangular region;

DESCRIPTION OF AN EMBODIMENT OF THE INVENTION

The present inventions relates to the possible remediation of AMD using maghemite and possible recovery of valuable resources. It has been realised that the benefits associated with the application of maghemite in sulphate removal without gypsum formation and metals recovery imbedded into maghemite and sludge/slurry are described.

Among eight known iron oxides, magnetite (Fe$_3$O$_4$), maghemite ($\gamma$-Fe$_2$O$_3$), and $\alpha$-Fe$_2$O$_3$ have been frequently used for biomedical and various industrial applications [18,19]. Particularly, the possible applications of Fe$_3$O$_4$ and $\alpha$-Fe$_2$O$_3$ nanoparticles (NPs) for AMD treatment have been evaluated and the obtained experimental results at the laboratory scale have shown that $\alpha$-Fe$_2$O$_3$ NPs could be used as an alternative and promising AMD treatment [20,21]. Studies have shown, under similar conditions of wastewater treatment, high metal removal capacity by $\gamma$-Fe$_2$O$_3$ NPs have been observed relative to Fe$_3$O$_4$ NPs for As(V) [22]. In fact, Fe$_3$O$_4$ NPs have higher catalytic properties in comparison to $\alpha$-Fe$_2$O$_3$, $\gamma$-Fe$_2$O$_3$ or goethite ($\alpha$-FeOOH) due to presence of Fe(II) and Fe(III) oxidation states [23].

Among technologies developed at laboratory scale, application of magnetic nanoparticles (MNPs) have several advantages such as the sludge produced in the presence of MNPs is dense, stable and less toxic [24]. In addition to significant sludge reduction, iron oxide could be easily recovered and used for paints and other industrial applications [4]. The metal removal and settlement rate is also faster and efficient compared to limestone or lime treatment of AMD options.

Application of $\gamma$-Fe$_2$O$_3$ NPs is important due to its several advantages such as non-toxicity [25], high adsorption capacity of metals, metalloids, organic pollutants, ease of synthesis and availability, ease of separation and reusability following treatments [26-30]. For example, $\gamma$-Fe$_2$O$_3$ NPs of 45 nm has shown high adsorption capacity in relative to bentonite and mesoporous $\gamma$-Fe$_2$O$_3$ NPs towards Congo red dyes [31]. Other studies, where simulated aqueous solution used with lower concentration of Mn$^{2+}$ (9.55 mg L$^{-1}$), Cu$^{2+}$ (14.99 mg L$^{-1}$), and U$^{6+}$ (42.2 mg L$^{-1}$) were used, observed the increase of removal percentage of the aforementioned pollutants via adsorption on $\gamma$-Fe$_2$O$_3$ NPs, for the pH change from 3 to 9 [32]. Similar studies also confirmed that high adsorption of organic dyes on $\gamma$-Fe$_2$O$_3$ NPs [33,34], and inorganic pollutants at lower pH 2.6 for Cr(VI) and at higher pH>6.5 for Cu$^{2+}$, Mn$^{2+}$, Ni$^{2+}$ and Cd$^{2+}$[35]. Its good adsorption capacity of different pollutant is related to its structure. Pure $\gamma$-Fe$_2$O$_3$ has spinel structure with 50/3% vacant space in octahedral site, $\gamma$-Fe$_2$O$_3$=[Fe$^{3+}$]$_A$[(5/3Fe$^{3+}$).1/3V]$_B$O$_4$, where V represents a vacancy [36,37]. The vacant octahedral sites can be easily occupied by cations with strong tendency for the octahedral sites such as Mg$^{2+}$, Ni$^{2+}$ and Gd$^{2+}$ [38]. For example, $\gamma$-Fe$_2$O$_3$ with a cubic structure has several applications, including magnetic recording device, biosensors, electromagnetic radiation attenuation, biomedical and wastewater treatments [18,39], as heterogeneous Fenton-catalyst for degradation of dyes [40].

The present invention demonstrates that maghemite is capable of assisting for the removal of potential toxic metal cations available in AMD at lower adjusted pH=5 using NH$_4$OH (aq.) followed by aeration or heat at 60° C. and stirring for 2 h. The metal removals were due to a combination of process mainly adsorption on the surface of maghemite nanoparticles, incorporating into maghemite, formation of their corresponding metal hydroxides. Maghemite acts as promoter of adsorption for both cations and anions, improving the saturation magnetisation of the sludge and also acts as nuclei or site for ferric dehydration and incorporation into it. The removal of Mn$^{2+}$ and sulphate in the presence of about 1 g L$^{-1}$ of maghemite adds value to AMD treatment and may in turn minimize the costs of treatment through recycle and reuse. Overall, the results of this study has shown an interesting and new insights into AMD treatment options with high metal and sulphate removal and recovery of the resources for possible reuse in the future.

The inventors have discovered that maghemite nanoparticles at pH of 5 is able to remove sulphate, manganese, copper, nickel, cobalt and zinc metal ions from acid mine drainage (AMD). In conventional way of AMD treatment, these pollutants are only removed at higher pH and requires costly alkaline chemicals to remove. The only metals which are known to precipitate at low pH are Iron (III) and Aluminium (III). The pH of AMD is extremely low, therefore to effectively achieve almost complete removal of the pollutants, method optimization is required. Relative to the conventional way of treatment, adsorption is highly convenient, cost effective and considered to be noble process. Preferably for this invention, a combination of adsorption and precipitation processes have been employed to achieve high metal and sulphate removal. The corresponding removal percentages of pollutants achieved in this study were manganese (79%), cobalt and zinc (98%), Nickel (96%), copper (100%) and sulphate (56%). Overall, the employed method makes use of less chemicals to remediate acid mine drainage pollution under cost effective scenarios, while also the possibility exists for recovering valuable resource from AMD.

| Features | Benefits |
|---|---|
| High removal of metals and sulphate at low pH. Small quantity of alkaline chemical required to adjust the pH. | Efficient AMD treatment. Water recovery for agricultural use. Cost effective due to sludge reuse |

The raw and filtrate solution were characterised using ICP-OES and Ion Chromatography (IC). While various techniques such as BET, EDX, FTIR, HRSEM, SQUID, TGA and XRD were used for maghemite and sludge characterisation. This invention demonstrates that maghemite can assist for the removal of potential toxic metal cations available in AMD at lower adjusted pH=5 using $NH_4OH$ (aq.) followed by aeration or heat at 60° C. and stirring for 2 hours. The metal removals are due to a combination of processes that include: adsorption on the surface of maghemite nanoparticles, incorporating into maghemite, and formation of their corresponding metal hydroxides.

EXAMPLES

1. Materials and Methods 1.1. Chemicals and Standards

Calibration standards were prepared from certified analytical grade chemicals of purity ≥99% sodium chloride, hydrated salts of aluminium nitrate and PerkinElmer ICP multi-element standard containing 100 mg $L^{-1}$ of 21 elements in 5% nitric acid (As, Be, Ca, Cd, Co, Cr, Cu, Fe, Li, Mg, Mn, Mo, Ni, Pb, Sb, Se, Sr, Ti, Tl, V and Zn). The analysis was done on ICP-OES, Agilent technologies 700 series ICP-OES coupled with Agilent SPS 3 auto sample preparation system. For anions determination, Metrohm 861 advanced compact ion chromatography (IC) was used. The IC calibration standards containing bromide, chloride, fluoride, nitrate, nitrite, phosphate and sulphate of 125 ml of 1000 mg $L^{-1}$ concentration was purchased from Inorganic Venture (IV-Stock-59). The pH of AMD samples were adjusted using 25% $NH_4OH$ (aq.). The quantity of 25% ammonium hydroxide solution required is determined by the strength of AMD acidity, and dependent on the type of AMD. The pH adjustment was done by dropwise addition of 25% ammonium hydroxide solution and gentle mixing and continues checking of the pH of the solution after each drop of ammonium hydroxide solution and mixing. Note that dropwise addition of 25% ammonium hydroxide solution will be continued till the pH of the mixture reaches 5.

The $\gamma$-$Fe_2O_3$ NPs was synthesised by sintering industrial magnetite at 150° C. under aeration for 3 h. The conversion of magnetite to maghemite requires heating in the range of preferably 150-250° C. for 3 to 6 hrs. This depends on the particle size of magnetite. The larger the magnetite size may require longer heating time within the range of temperature provided. If the temperature is higher than 250° C. there might be partial change to hematite, which also dependent on the sintering time. It should be noted that in this work industrial grade magnetite which was quite exposed to air for more than a month has been used. There might be formation of maghemite even before sintering.

1.2. AMD Collection and Preparation AMD of coal mine was collected in April 2018 from Mpumalanga province in cleaned PVC plastic drums and kept at 4° C. until analysis and treatment. The cations and anions concentration in the raw sample was first determined using ICP-OES and Ion chromatography (IC), respectively. Predetermination of compositions aids to apply an appropriate techniques for valuable cations and anions recovery. As presented in Table 1, the collected AMD contains high iron and sulphate concentrations.

The treated acid mine drainage has the following unique properties and various chemical composition such as:
1. low pH≤2,
2. high concentration of iron >2000 mg/L
3. High concentration of sulphate >9000 mg/L
4. About 93 and 13 mg/L of Mn and Zn ions, respectively
5. About 350-400 mg/L of Al, Ca and Mg ions
6. Less than 10 mg/L of As, Co, Cr, Cu, Mg, Ni, Pb and about 50 mg/L Na ions 1.3. AMD Treatment In order to observe the difference in heating and aeration, in the presence of $\gamma$-$Fe_2O_3$, duplicate AMD samples of 120 ml were taken, and the pH adjusted to 5 using 25% $NH_4OH$ (aq.), and 0.94 (~1) g $L^{-1}$ of $\gamma$-$Fe_2O_3$ added to each AMD samples. The pH selection was made based on pH range in which iron rich sludge recovery is possible either via ferric hydroxide precipitation or incorporation into $\gamma$-$Fe_2O_3$, the amount of $\gamma$-$Fe_2O_3$ required at least needs to be in the mole ratio of $\gamma$-$Fe_2O_3$:Fe in the AMD (1:2) to be used as seed. After pH adjustment, one sample was aerated using compressed air (pure oxygen can also be used) and another heated at 60° C. with continues stirring speed of 250 rpm, for 2 hrs. After which, the samples kept standing for 3 h settling time. Finally, the sludge (precipitated metals, maghemite and adsorbed metals from the AMD) and solution (water and some metals not removed from AMD) separated by filtration. In order to observe what has been removed and left in the solution, the filtrates of each treated AMD samples were analysed using ICP-OES and IC. In order to validate the presence of some functional groups such as Fe—O bond as well as sulphate, carbonate and hydroxides, the solid samples were analysed on FTIR spectrometer, the sample preparation and conditions employed were described elsewhere [41].

The sludge obtained from treated AMD by aeration is denoted as "Sludge A" and by heating as "Sludge H". Both recovered sludge A and H were placed in the oven at 105° C. and dried overnight for 12 h. Thereafter, to observe the possible crystalline chemicals to be produced, half of dry sludge H was taken and calcined at 500° C. for 3 h and then cooled to room temperature. Finally, small amount of sludge was taken from each and characterised using XRD, HRSEM, SEM-EDX and VSM.

1.4. Analytical Techniques Used for Characterisation

The cations and anions present in the raw and treated filtrates of AMD were determined using inductively coupled plasma-optical emission spectrometry (ICP-OES) and ion chromatography (IC), respectively. The $\gamma$-$Fe_2O_3$ NPs and dried sludge (recovered from treated AMD) were characterised using numerous analytical tools such as superconducting quantum interference device (SQUID) as well as vibrating sample magnetometer (VSM) (Model 6000 PPMS) for magnetic properties measurement. Scanning electron microscopy (SEM) (JSM-IT300LV and high resolution scanning electron microscopy (HRSEM) coupled with energy dispersive X-ray spectrometry (EDX) (OXFORD instrument X-MAXN), for surface morphology and elemental composition determination, respectively. Mineral compositions were identified by using X-ray diffraction (XRD), the XRD patterns were recorded by Rigaku/Smartlab X-ray diffractometer with Cu-K$\beta$ radiation at 45 kV and 200 mA, using continues scan mode, in the 2θ scan range of 5-90° with a step size of 0.02° and a scan speed of 5 deg. $min^{-1}$.

Mineral compositions were identified by software matching the installed database of the International Centre for Diffraction Data ICDD (PDF-2 Release 2019 RDB) for inorganic crystals. While surface area of γ-$Fe_2O_3$ NPs was determined by using Brunau-Emmett-Teller (BET), on autsorb iQ/ASiQwin instrument. The detailed procedures employed for characterisations are as described elsewhere [21]. Furthermore, the γ-$Fe_2O_3$ NPs was characterised using thermogravimetric analyser (Trios TGA 5500) equipped with high temperature furnace, the temperature was programmed to increase 10° C. $min^{-1}$ to 900° C., under 25 ml $min^{-1}$ of $N_2$ and air flow to observe the thermal stability of γ-$Fe_2O_3$ NPs, in the temperature range of 30-900° C.

2. Results and Discussion

2.1. Maghemite Characterisation

Figure 1:
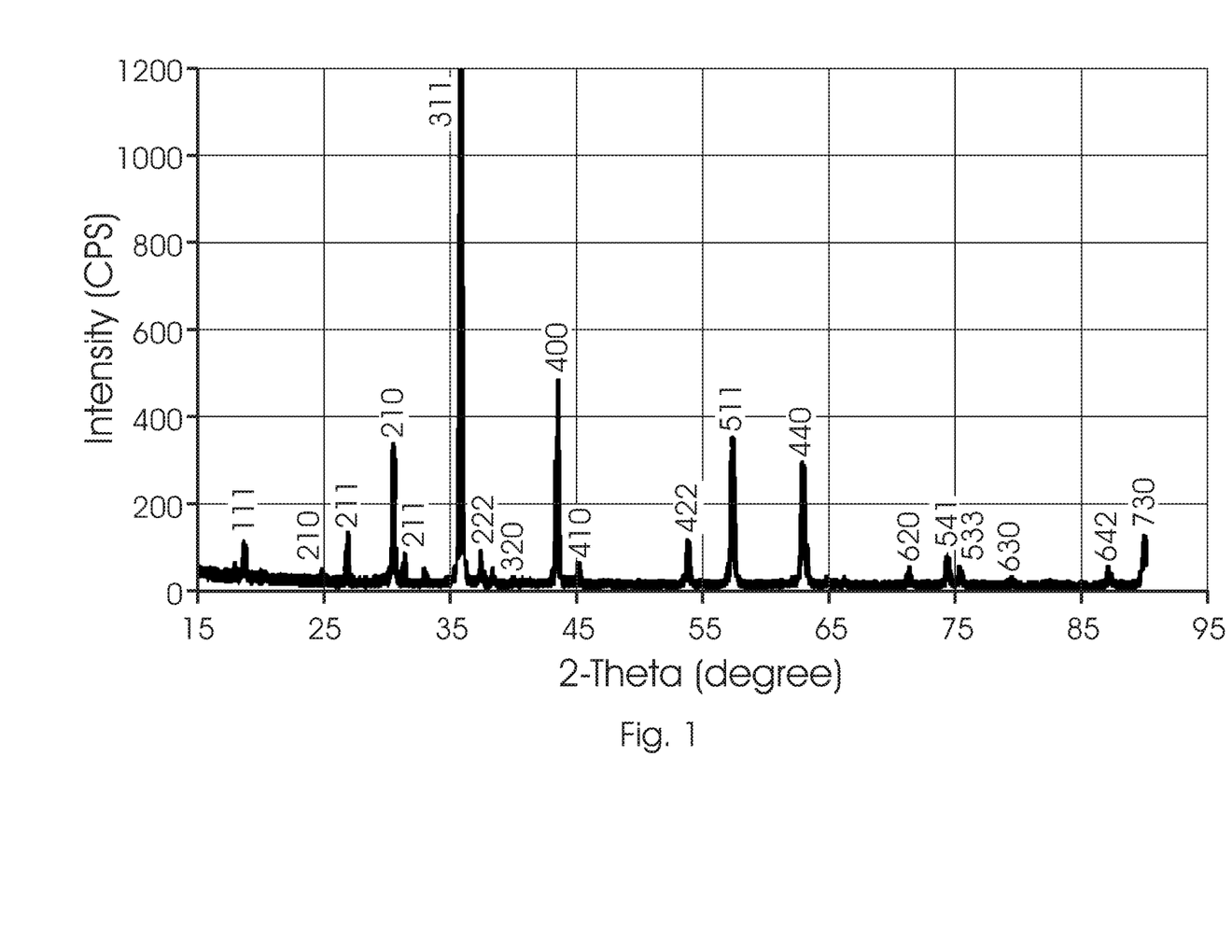
FIG. 1 is a diagram of X-ray diffraction (XRD) patterns of synthesised γ-$Fe_2O$ nanoparticles.

The mineral composition of γ-$Fe_2O_3$ NPs as determined by powder XRD corresponds to 97.4% γ-$Fe_2O_3$, 2.0% $Fe_3O_4$ and 0.6% α-$Fe_2O_3$. The XRD patterns of the synthesised γ-$Fe_2O_3$ NPs are presented in FIG. 1. Peaks at 29 of 18.5°, 25.3°, 26.7°, 30.3°, 31.2°, 35.7°, 37.3°, 38.2°, 43.3°, 45.0°, 53.7°, 57.2°, 62.8°, 71.2°, 74.2°, 75.2°, 79.2°, 87.0° and 90.0° with diffraction indices of (111), (210), (211), (220), (211), (311), (222), (320), (400), (410), (422), (511), (440), (620), (541), (533), (630), (642) and (730) planes confirmed formation of γ-$Fe_2O_3$. As can be seen from FIG. 1, the peaks are sharp and with high intensity, and reveals the high crystalline nature of the synthesised γ-$Fe_2O_3$ NPs from magnetite recovered from coal mining waste. All peaks can be indexed to phase group 96:P48212, cubic shape, with lattice parameters of a=b=c=8.35 Å, and matches with DB card reader 01-076-1470. Magnetite ($Fe_3O_4$) and γ-$Fe_2O_3$ XRD patterns are similar but the presence of peaks at 29 of 18.5°, 25.3° and 26.7° are a common characteristics of γ-$Fe_2O_3$ phases not present in $Fe_3O_4$[42]. The FTIR analysis results, which confirmed the presence Fe—O bond are presented in section 2.3.2.1.

Figure 2:
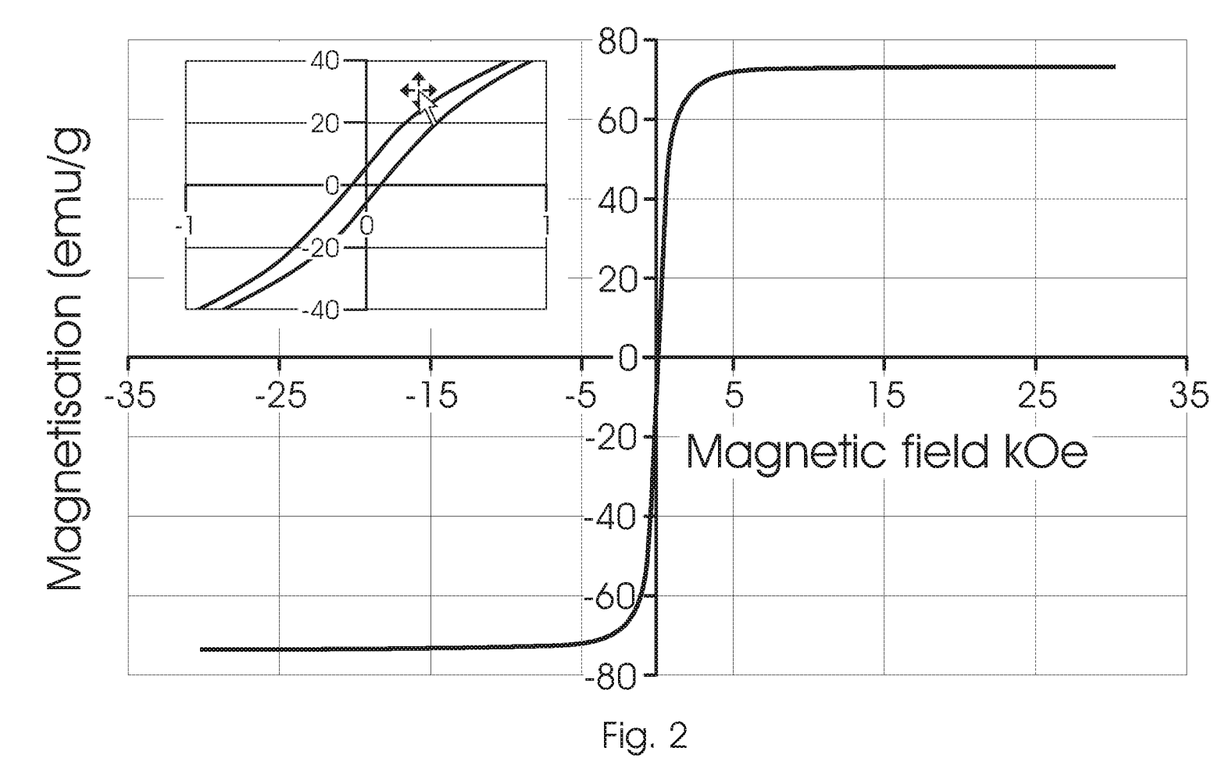
FIG. 2 is a diagram of hysteresis loops of $\gamma$-Fe$_2$O$_3$ nanoparticles measured at 300 K by using superconducting quantum interference device (SQUID)
Figure 3:
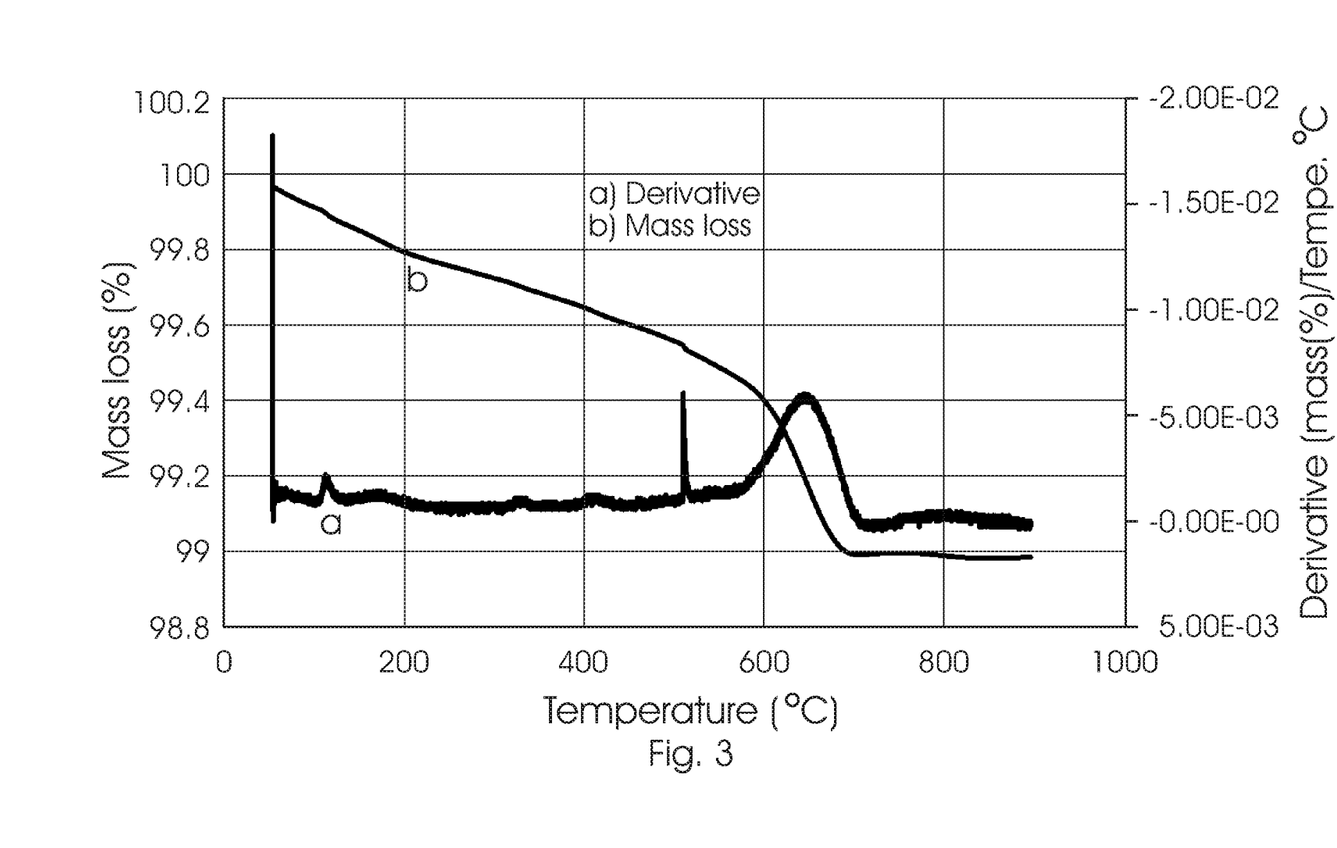
FIG. 3 is a diagram of thermogravimetric analysis of $\gamma$-Fe$_2$O$_3$ nanoparticles.
Figure 4A:
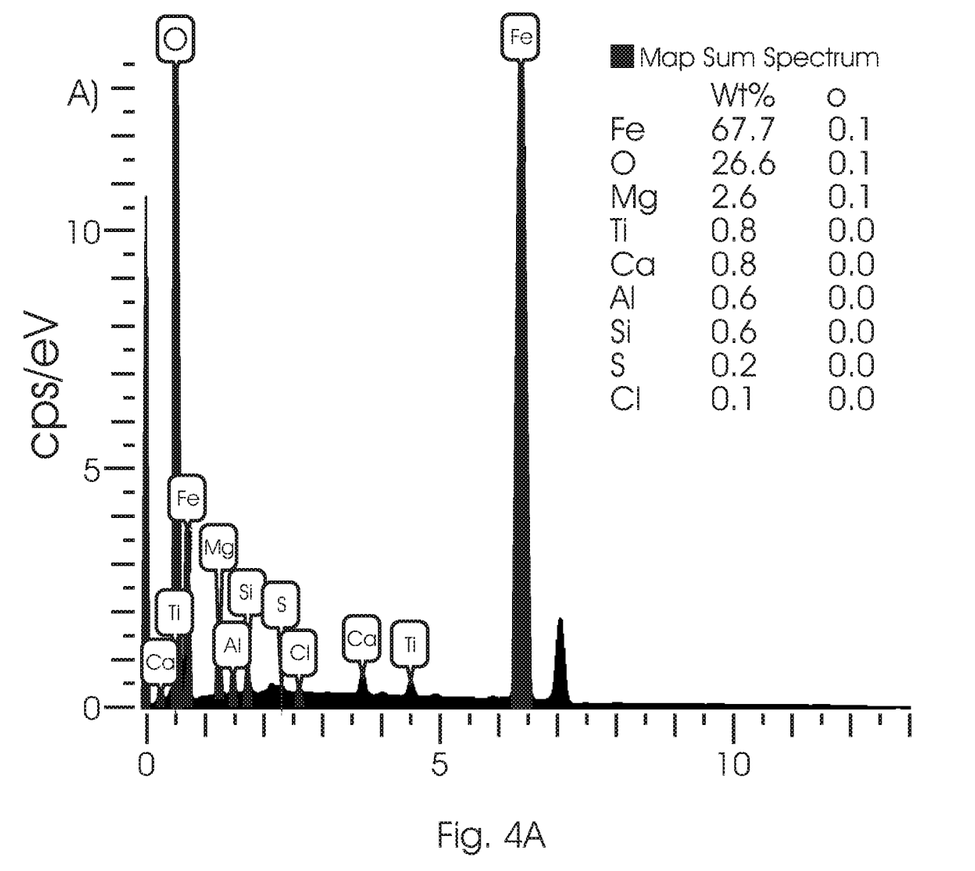
Figure 4B:
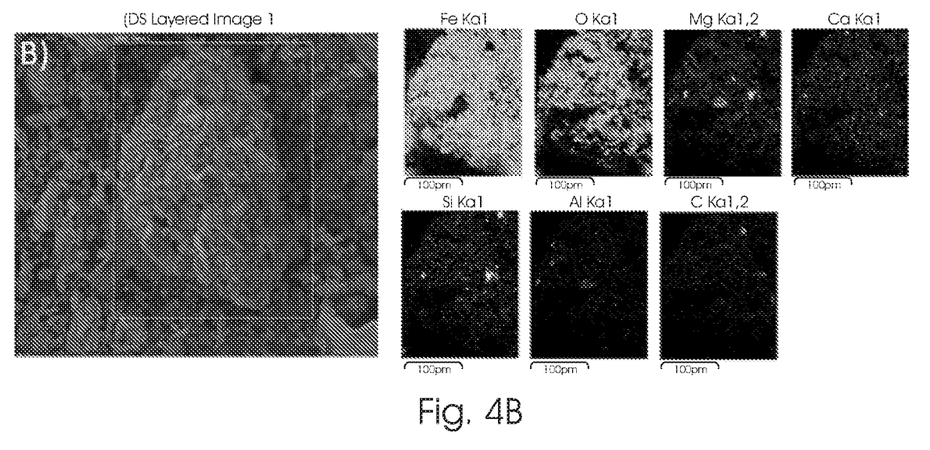

The average particle size of γ-$Fe_2O_3$ NPs as determined by using XRD is 46.7 nm, but poses low Brunauer-Emmett-Teller (BET) surface area of 8.08 $m^2$ $g^{-1}$. It presents higher saturation magnetization ($M_s$) of 73.4 emu $g^{-1}$ at 300 K, which is almost the same as the bulk value (74 emu $g^{-1}$) [43], with low residual magnetisation ($M_r$) and coercivity ($H_c$) values of 3.37 emu $g^{-1}$ and 25.1 Oe, respectively (FIG. 2). This result demonstrates the superparamagnetic character of synthesised γ-$Fe_2O_3$ NPs with high magnetic response, confirming its possible potential application in separation technology, and easily separated after being used for wastewater treatment by an external magnetic field. In recent study, γ-$Fe_2O_3$ NPs was incorporated into concrete improved arsenic removal via adsorption relative to when only concreate was used [44]. The TGA analysis of γ-$Fe_2O_3$ NPs has shown only about 1% mass loss when heated up to 700° C., afterwards the mass loss remained constant to 900° C. This demonstrates the presence of trace impurities (FIG. 3). The surface elemental composition (weight percentage) and elemental distribution (elemental mapping) of γ-$Fe_2O_3$ NPs analysis results are presented in FIG. 4. As can be seen from EDX analysis FIG. 4A, about 94% of surface elemental composition of γ-$Fe_2O_3$ NPs are Fe and O. While less than 6% elemental composition accounts for Ca, Ai, Si, Mg, S and Cl, the elemental mapping also confirms similar fact (FIG. 4B).

Based on the elemental composition detected in the γ-$Fe_2O_3$ and possible gaseous formation can be predicted as water removal, at temperature (98-113° C.), iron carbonate decomposition and removal of carbon dioxide at about 510° C. and iron sulphate decomposition and sulphur dioxide removal in the temperature range of 580-730° C. The presence of sulphate has been confirmed based on the FTIR spectra and EDX analysis results. However, due to the presence of trace iron carbonate, it has not been detected by XRD, the thermal decomposition of pure iron carbonate to ferric oxide was reported at about 495° C. in a previous research [45].

2.2. Raw AMD

The concentration of metals and anions present in the collected coal mine AMD were determined using ICP-OES and ion Chromatography (IC), respectively. The analysis results are presented in Table 1. The analysis results have shown the presence of high concentration of iron and aluminium followed by magnesium and calcium ions. The concentration of sulphate found in AMD was among the highest in South Africa polluted AMD. Recent study conducted on the water quality analysis of the same area, where this coal AMD samples collected also confirmed seriously deterioration of water quality, which is directly linked to the coal mining activities and contamination of water resources with AMD [46].

2.3. Treated AMD

2.3.1. Filtrate

Treatment of AMD in the presence of γ-$Fe_2O_3$ NPs at an adjusted pH of 5 either heating at low temperature of 60° C. accompanied with continuous stirring or aeration assisted for possible recovery of iron and sulphate (Table 1). The ICP-OES analysis result of the filtrate has shown, at such low pH a total of 94 and 84% of the metals were removed by the applied treatment techniques relative to the metals present in the raw AMD, respectively. In the presence of γ-$Fe_2O_3$ NPs, the metal removal at acidic pH is in favour of heating than aeration. Toxic metal removal from AMD is of great importance in terms of environmental protection and economic reasons. As to the latter case, the recovered metals could be utilised in different industries and the profits obtained may subsidise cost of treatment, and consequently the process will be cost effective and valuable for sustainability issues [4,47]. For example, it has been estimated that about 360 mega-litter metal-ferrous mine water effluents are discharged to South African environments per a day from gold and coal mines [48]. Taking into account the concentration of total iron detected in raw AMD of this study, which is 2.03 g $L^{-1}$ Fe and almost complete removal after treatment, it is possible to recover about 730 tone of Fe per day from coal mine drainage discharge. The recovery not only important in terms of economic point of view but also reduces environmental pollution such as water resources and aquatic ecosystems.

Figure 5:
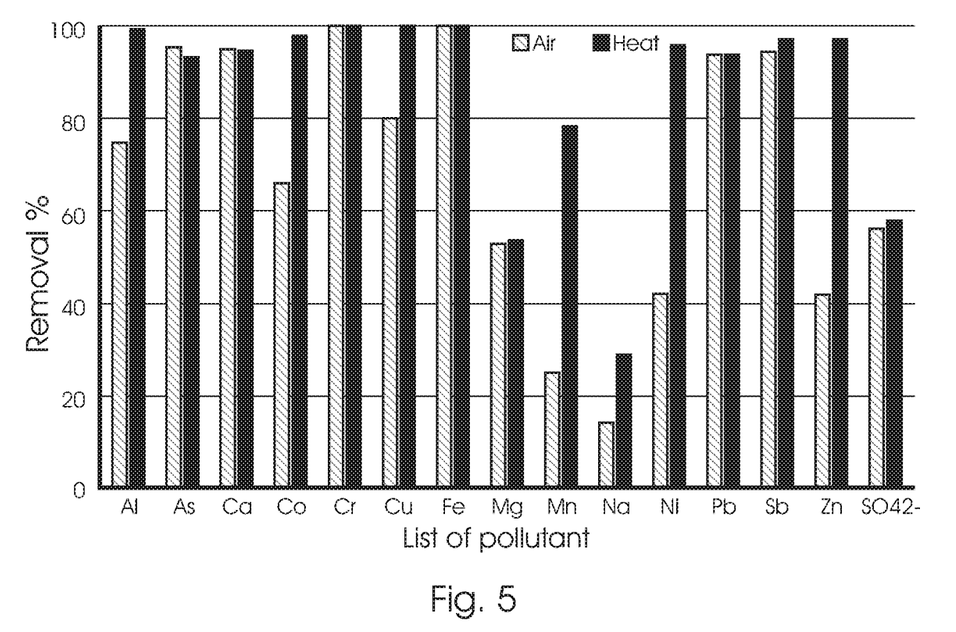
FIG. 5 is a diagram showing the metal percentage removal from acid mine drainage under aeration and heating with continuous stirring in the presence of an arbitrary mass of ~1 g L$^{-1}$ of $\gamma$-Fe$_2$O$_3$ nanoparticles for 2 hours.

In addition to metal removal about 56% of sulphate was also removed under both experimental conditions in the presence of γ-$Fe_2O_3$ NPs. whereas, almost 79% of $Mn^{2+}$ removal during simultaneous heating and stirring, while only about 25% was removed by aeration. Metals, which are only removed at higher pH such as $Mn^{2+}$, $Zn^{2+}$ and $Ni^{2+}$ were removed at such lower pH. In conventional AMD treatment, the cost of chemicals required to increase pH>9 for $Mn^{2+}$ removal and also the cost of acid required for lowering the treated AMD water to the neutral pH is high. In addition, increasing pH leads to aluminium hydroxide dissolution, which is another problem to the quality of treated water. This means, the developed method has high cost reduction by cut off the chemicals required to treat water to the standard dis-chargeability levels. Particularly, the high sulphate concentration observed after treatment can be reduced below the standard dis-chargeable limit by further treating using soluble salts of barium or barium hydroxide without further increasing the pH. During conventional AMD treatment, when lime or limestone is used, manganese ion ($Mn^{2+}$) is removed only at higher pH>9, and it is among problematic toxic metals in terms of removal from AMD, and exist at acidic or neutral pH in acid mine drainage. It has potentially negative impacts on ecosystems and receiving water bodies [49]. Furthermore, it has been noted that the removal of Al, Co, Cu, Na, Ni, and Zn were more favoured by heating and stirring than aeration, but no distinction observed in terms of removal for As, Cr, Fe and Pb in between both experimental conditions (FIG. 5). This is because the first two metals can be easily removed via adsorption while stirring or aeration facilitated the oxidation of Fe(II) to Fe(III), and its removal as ferric hydroxide precipitate. The decrease of pH from 5, is clearly an indication of some of the metals removal via metal hydroxide precipitation.

The $\gamma$-$Fe_2O_3$ NPs surface commonly positively charged below its pH of zero point charge ($pH_{pzc}$) 7.5, the more the acidic the solution the surface charge of $\gamma$-$Fe_2O_3$ NPs becomes more positively charged [50]. Previous studies have shown that high adsorption of metal oxyanions such as arsenite $(AsO_3)^{3-}$ and arsenate $(AsO_4)^{3-}$ [28,51], and chromate $(CrO_4^{2-})$ [39], under acidic conditions. The high removal of the metal oxyanions are due to their negatively charged attraction to the $\gamma$-$Fe_2O_3$ NPs surface, which is positively charged under the acidic condition [28]. Therefore, in the same way sulphate can be easily attracted on the surface of positively charged $\gamma$-$Fe_2O_3$ under low pH, and hence removed from the solution. In addition, the presence of unoccupied vacant positions in the $\gamma$-$Fe_2O_3$ NPs, metals can be easily adsorbed and embedded into it [36]. Low sulphate concentration, can be removed easily via adsorption on the active sites, while with high concentration of sulphate, which is similar to this study, the active sites will be saturated and complete removal of sulphate is impossible. Therefore, optimisation of the initial amount of adsorbents is required for complete sulphate removal. Another interesting thing about $\gamma$-$Fe_2O_3$ NPs is that it can be synthesised from AMD or from locally available large quantities of $Fe_3O_4$ prepared from coal mine.

Another interesting findings, which makes this research work more important is the simultaneous removal of sulphate and iron from AMD at lower pH. Because, calcination of the sludge at appropriate temperature can produce iron sulphate which is industrially important chemicals.

TABLE 1

Concentration of metals and sulphate in mg $L^{-1}$ in raw and treated AMD

| | pH | Al | As | ca | Co | Cr | Cu | Fe |
|---|---|---|---|---|---|---|---|---|
| Raw AMD | 2.0 | 397 | 4.5 | 349 | 4.7 | 1.5 | 1.5 | 2031 |
| Aerated[b] | 4.3[a] | 101 | 0.2 | 180 | 1.6 | 0.0 | 0.3 | 1.2 |
| Heated[c] | 4.5[a] | 1.3 | 0.3 | 180 | 0.1 | 0.0 | 0.0 | 0.2 |

| | Mg | Mn | Na | Ni | Pb | Sb | Zn | sulphate |
|---|---|---|---|---|---|---|---|---|
| Raw AMD | 396 | 93 | 51 | 2.4 | 1.6 | 3.7 | 13.4 | 9357 |
| Aerated[b] | 387 | 70.1 | 43.9 | 1.4 | 0.1 | 0.2 | 7.8 | 4111 |
| Heated[c] | 385 | 19.9 | 36.4 | 0.1 | 0.1 | 0.1 | 0.3 | 3952 |

[a]Final pH after treatment
[b]AMD (120 mL) in the presence of 114 mg $\gamma$-$Fe_2O_3$ NPs only aerated using compressed air
[c]AMD (120 mL) in the presence of 113 mg $\gamma$-$Fe_2O_3$ NPs heated at 60° C. and under continues stirring

2.3.2. Sludge/Slurry

The sludge obtained after treatment of AMD were characterised using various techniques and the analysis results are briefly presented under the following sections. The slurry or commonly called the sludge, it is composed of precipitated metals, maghemite and adsorbed metals from the AMD.

2.3.2.1. Bonds and Functional Groups

Figure 6:
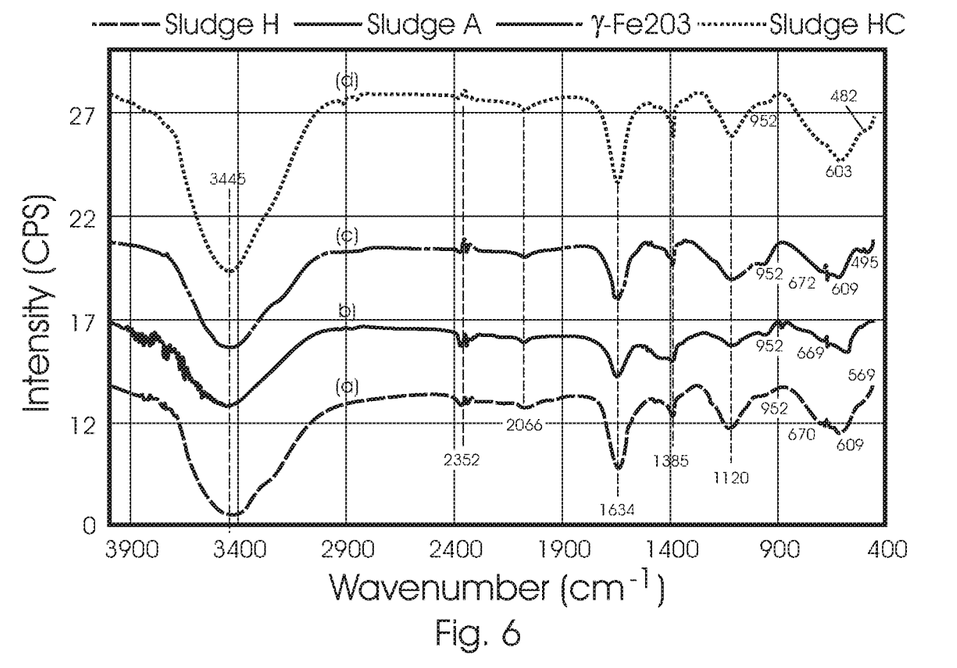
FIG. 6 shows a Fourier Transform Infrared Spectroscopy (FTIR spectra) of a) Sludge H, b) $\gamma$-Fe$_2$O$_3$ nanoparticles, c) Sludge A and d) Sludge HC.

The FTIR spectra of selected sludge of interest are presented in FIG. 6. The FTIR spectrum of $\gamma$-$Fe_2O_3$ NPs and sludge showed broad bands at 3445 $cm^{-1}$ and strong bands at 1634 $cm^{-1}$ due to the O—H vibrational stretching and bending modes, respectively. It should be also noted that the O—H vibrational bending modes are overlapped with commonly observed sulphate and carbonate vibrational stretching 1634 $cm^{-1}$, as many research findings confirms [52-54]. Weak bands at 1385 $cm^{-1}$ ascribed to C—O stretching vibrations of trace carbonate ions [55,56]. In addition, the broad bands at 1120 corresponds to S=O stretching in sulphate, and it is weak in $\gamma$-$Fe_2O_3$ NPs. The shoulder peaks at 952 $cm^{-1}$ in all analysed samples and two well identified peaks observed in the three samples a, b and c in between 559-672 $cm^{-1}$ could be assigned to symmetric stretching and out of plan bending vibrations of $SO_4^{2-}$, respectively [57]. High sulphate removal has been confirmed from the treated AMD filtrate analysis using ICP-OES. Detailed study conducted on analysis of sulphate and carbonate using FTIR has shown variation of peaks position depending up on the type of cations with which these anions are bonded [54]. The tetrahedral and octahedral Fe—O stretching vibration in the FTIR for $\gamma$-$Fe_2O_3$ NPs, sludge H and Sludge A are observed at 669, 670, 672 and 569, 609 and 609 $cm^{-1}$, respectively. These peaks are not sharp due to overlapping with sulphate S=O and S—O vibrational bending modes. The shift to higher frequency (569 to 609 $cm^{-1}$) for the octahedral position suggests increase in bond strength of Fe—O due to $\gamma$-$Fe_2O_3$ NPs surface stabilisation with adsorbed pollutant in both sludge H and A. Depending upon the stability, particle size and surrounding environment around Fe—O bonds, the stretching vibration bands may be observed at lower or higher energy levels. For example, the reported tetrahedral and octahedral Fe—O in $\gamma$-$Fe_2O_3$ NPs stretching vibration at 639 and 561 $cm^{-1}$ [35], and 640 and 558 $cm^{-1}$ [58], respectively. For the calcined sludge (sludge HC, i.e. calcination of sludge H), the tetrahedral Fe—O bands completely absent showing that transformation of $\gamma$-$Fe_2O_3$ NPs to $\alpha$-$Fe_2O_3$ NPs due to calcination, and its Fe—O stretching vibration has been detected at 603 $cm^{-1}$. In the literature Fe—O stretching vibration of 588 $cm^{-1}$ [59], and 584 $cm^{-1}$ [60], were reported for pure $\alpha$-$Fe_2O_3$ NPs. Furthermore, strong and sharp peaks were observed for sludge HC compared to the other three, which might be also related to calcination.

2.3.2.2. Mineral Compositions

Figure 7A:
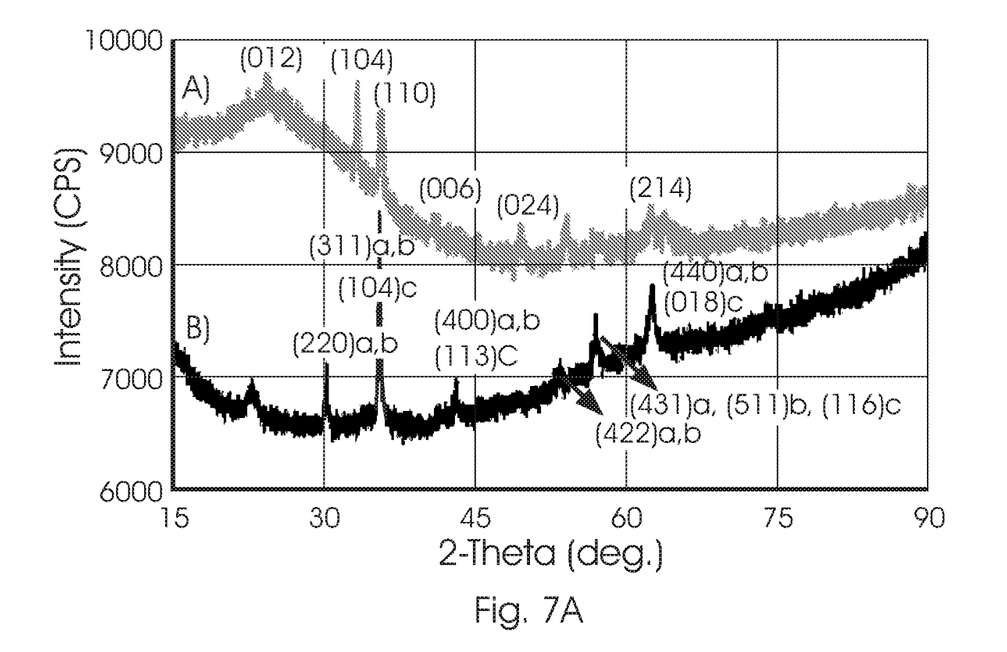
FIG. 7A is a diagram of XRD patterns of sludge obtained from acid mine drainage treatment for A) Sludge HC and B) Sludge H (a=$\gamma$-Fe$_2$O$_3$, b=Fe$_3$O$_4$ and c=$\alpha$-Fe$_2$O$_3$)
Figure 7B:
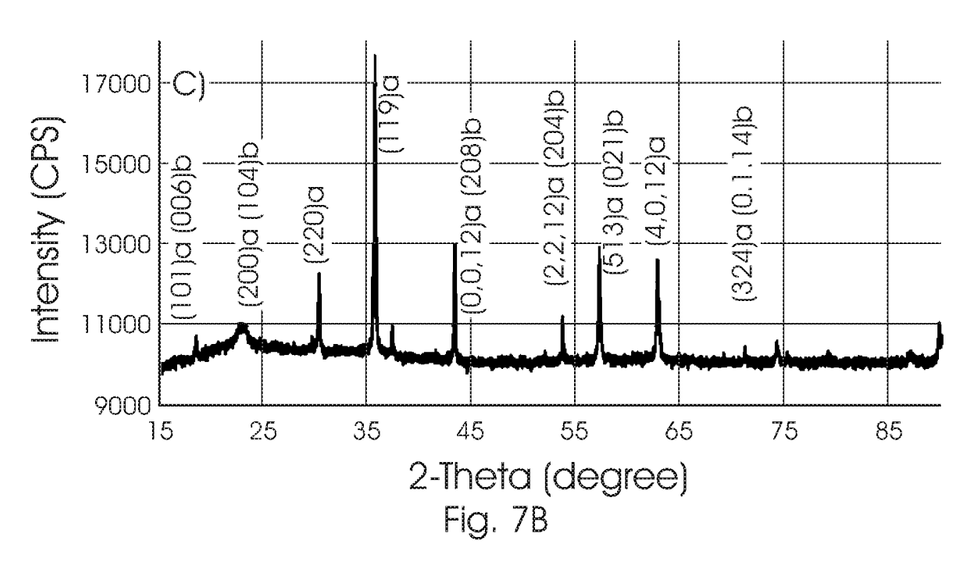
FIG. 7B is a diagram of XRD patterns of sludge obtained from acid mine drainage treatment for C) Sludge A (a=$\gamma$-Fe$_2$O$_3$ and b=Mn$_{0.7}$Al$_{10.5}$Mg$_{0.5}$O$_{17}$)

The XRD analysis results for the sludge obtained from AMD treatment in the presence of $\gamma$-$Fe_2O_3$ NPs are presented in FIGS. 7A-7B. As can be seen from FIG. 7A-7B, there is no significance change observed to the sludge obtained via aeration, in terms of peak resolution. The mineral identification has shown formation of crystalline spinel type hexagonal structure $Mn_{0.7}Al_{10.5}Mg_{0.54}O_{17}$, which is responsible for the removal of three pollutants in AMD. However, the sludge obtained under heating and continuous stirring have shown increase in intensity, broaden in width. Particularly, after sludge H was calcined, loss of the previous peaks and appearance of new peaks are observed. The position of the emerged peaks and miller indexes determined from XRD analysis demonstrated the change of $\gamma$-$Fe_2O_3$ NPs to $\alpha$-$Fe_2O_3$.NPs. The minerals identified and corresponding crystalline sizes are presented in Table 2. It seems, the removal of high Mn(II) during heating time did not form any crystalline compounds, its removal is only possible via adsorption either into the sludge produced during the reaction or $\gamma$-$Fe_2O_3$ NPs added for AMD treatment. In fact, the SEM EDX results has clearly shown its presence in the sludge.

isotherm equations. Because, metals are not only removed through adsorption to $\gamma$-$Fe_2O_3$ NPs but also by a combination of different mechanisms as stated in previous work [21]. In addition, once iron hydroxide, iron ox-hydroxide or aluminium hydroxide precipitates are formed during the treatment process, they are also responsible for the removal of cations and anions through adsorption and followed by co-precipitation [61-63].

TABLE 2

XRD analysis results of minerals detected in sludge recovered from AMD

| Type | Phase, formula chemical | Content (%) | Lattice parameter (Å) | DB card reader No | Particle size (nm) |
|---|---|---|---|---|---|
| Sludge A | $Mn_{0.7}Al_{10.5}Mg_{0.5}O_{17}$ | 99 | a = b = 5.56 c = 33.87 | 01 073 5081 | 92.9 |
| | $\gamma$-$Fe_2O_3$ | 1 | a = b = 8.37, c = 25.12 | 01 076 3169 | — |
| Sludge H | $\gamma$-$Fe_2O_3$ | 72 | a = b = c = 8.37 | 01 089 5892 | 46.5 |
| | $Fe_3O_4$ | 7 | a = b = c = 8.37 | 01 088 0315 | — |
| | $\alpha$-$Fe_2O_3$ | 21 | a = b = 4.82, c = 12.68 | 01 072 6232 | — |
| Sludge HC | $\alpha$-$Fe_2O_3$ | — | a = b = 5.04, c = 13.92 | 01-084 9870 | 2.15 |

2.3.2.3. Magnetic Properties

Figure 8:
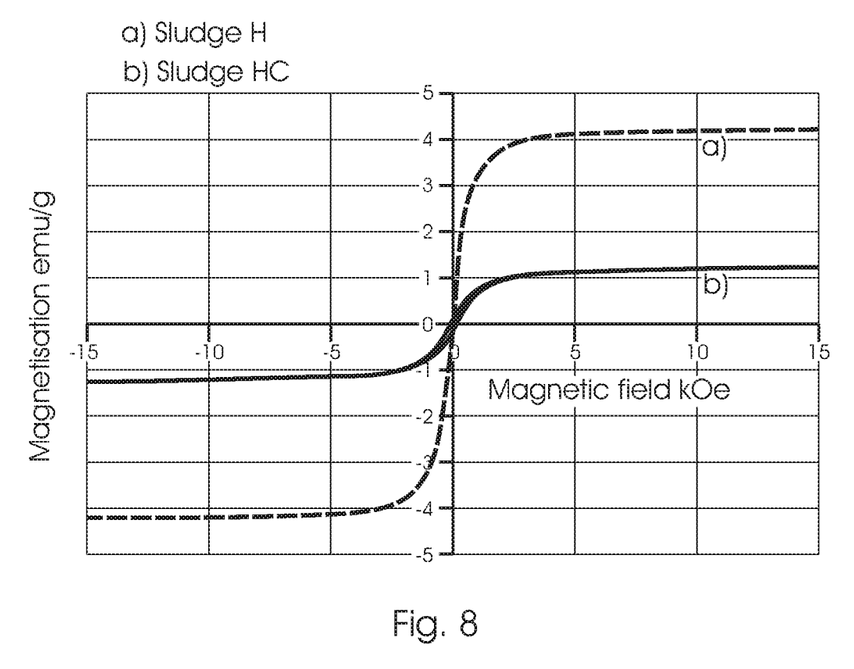
FIG. 8 is a diagram of hysteresis loops of dry sludge obtained after acid mine drainage treatment.

As shown in FIG. 8, the determined saturation magnetisation ($M_S$) at 300 K of dried sludge obtained from AMD treatment after aeration (sludge A) and stirring accompanied with heating at 60° C. (Sludge H) were 6.39 and 4.22 emu $g^{-1}$, which corresponds to a decrease of 91.3 and 94.3% compared to the $M_S$ values of initially used $\gamma$-$Fe_2O_3$ NPs for AMD treatment, respectively. The decrease in $M_S$ values is expected due to pinning of the surface spin by adsorbed pollutant on the surface of $\gamma$-$Fe_2O_3$ NPs. The determined $M_S$ value for calcined sludge at 500° C. (Sludge HC) was extremely decreased to 1.2 emu $g^{-1}$. In addition, the XRD analysis results has shown disappearance of some initially existing peaks in the $\gamma$-$Fe_2O_3$ NPs and formation of new peaks. This is due to complete change of $\gamma$-$Fe_2O_3$ NPs into hematite, as confirmed from XRD sludge results (Table 2). The lower $M_s$ value is common magnetic properties of hematite but in this case such lower values also attributed to more pollutant adsorption on the surface and result in spin pinning of the iron adsorbed on the surface. In fact, there are several factors affecting $M_s$ values such as type and amount of impurity, surface phenomena, type of incorporated metals and particle size of the as-prepared materials. The change in magnetic properties clearly has shown extreme decrease of the $M_s$ without affecting the residual magnetisation, coercivity and superparamagnetic behaviour of $\gamma$-$Fe_2O_3$ NPs.

2.3.2.4. Morphology and Elemental Composition

Figure 9:
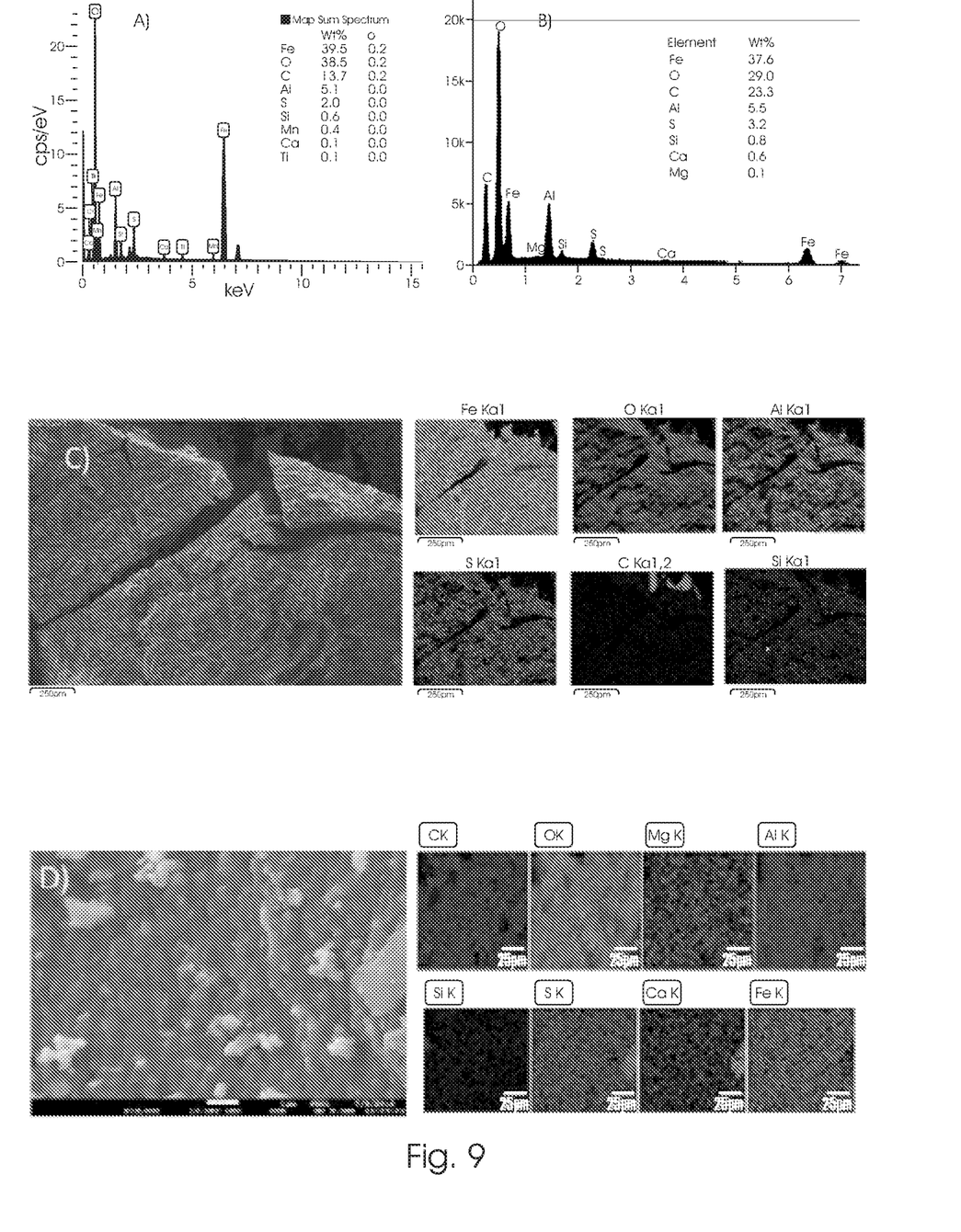
FIG. 9 shows an EDX spectra of A) Sludge H and B) Sludge HC, and SEM-EDX mapping of C) sludge H and D) sludge HC.

The EDX and SEM-EDX elemental mapping of selected sludge obtained from AMD are presented in FIG. 9. The analysis results clearly revealed that the presence of most of the metals present in the raw AMD also in the sludge. This shows that the possibility of toxic metals removal by addition $\gamma$-$Fe_2O_3$ NPs, which enhances their removal efficiency. It should be also noted that it is not possible fitting to frequently used adsorption isotherms and kinetic models of the metal removal neither to Langmuir nor to Freundlich 3. Application of AMD Sludge The application of different types of sludge obtained from AMD treatment are well addressed in one of recent review [64]. Based on the XRD mineral analysis and elemental composition iron and sulphate. In order to circumvent environmental and economic related problems of sludge disposal, reuse of the sludge by applying different techniques is necessary. It is also possible for the preparation of different type of ferrite groups (eg hexa-ferrite) by calcination of the sludge, the properties of the sludge can be changed from less stable to stable, for example by aeration more stable $Mn_{0.7}Al_{10.5}Mg_{0.5}O_{17}$ NPs were formed, which possibly could be used in ceramic industries as an additive (Table 2). As previously reported, presence of different transition metals in the sludge are important as an inorganic pigments [47,65], For example, after calcination at appropriate temperature, AMD sludge could be used as additives in pigments, glazes or ceramic tile coloration materials [66]. The gases released during calcination, particularly $SO_2$ (g), can be captured and used for sulphuric acid manufacture. Since iron and sulphate are removed simultaneously, ferrous sulphate can be also prepared via calcination of the sludge at appropriate lower temperature, lower than the decomposition temperature of sulphate, and could be used in the reduction of $Cr^{6+}$ to non-toxic $Cr^{3+}$ in the manufacture of cement [67], for purification of water as flocculants and phosphate removal, and many other several industrial applications.

4. Conclusion

This research work clearly demonstrates an effective metal and sulphate removal from AMD at lower pH<5 in the presence of about 1 g $L^{-1}$ $\gamma$-$Fe_2O$ NPs. For iron and aluminium removal, metal hydroxide precipitation is the most important mechanism. While for sulphate and other metals adsorption on the surface of $\gamma$-$Fe_2O$ NPs and pre-precipitated metal hydroxides are responsible. Heating facilitated stabilisation as well as formation of high density sludge, stirring enhances collision of particles for the formation of stable minerals. In the case of aeration, the oxygen aid for oxidation of iron (II) to iron (III), and its removal via ferric hydroxide formation. It has also been observed that the resources recovered from this work are useful for different industrial applications after stabilised by calcination.

REFERENCES

[1] Y. Han, S. Youm, C. Oh, Y. Cho, J. S. Ahn, Geochemical and eco-toxicological characteristics of stream water and its sediments affected by acid mine drainage, Catena. (2015). doi:10.1016/j.catena.2015.11.015.

[2] A.-M. Pierre Louis, H. Yu, S. L. Shumlas, B. Van Aken, M. A. A. Schoonen, D. R. Strongin, Effect of phospholipid on pyrite oxidation and microbial communities under simulated Acid Mine Drainage (AMD) conditions, Environ. Sci. Technol. 49 (2015) 7701-7708. doi:10.1021/es505374g.

[3] R. A. Crane, D. J. Sapsford, Selective formation of copper nanoparticles from acid mine drainage using nanoscale zerovalent iron particles, J. Hazard. Mater. 347 (2018) 252-265. doi:10.1016/j.jhazmat.2017.12.014.

[4] K. K. Kefeni, T. A. M. Msagati, B. B. Mamba, Acid mine drainage: Prevention, treatment options, and resource recovery: A review, J. Clean. Prod. 151 (2017) 475-493. doi:10.1016/j.jclepr$_{0.2017.03.082}$.

[5] O. K. Bekmezci, D. Ucar, A. H. Kaksonen, E. Sahinkaya, Sulfidogenic biotreatment of synthetic acid mine drainage and sulfide oxidation in anaerobic baffled reactor, J. Hazard. Mater. 189 (2011) 670-676. doi:10.1016/j.jhazmat.2011.01.087.

[6] E. Balboni, A. Simonetti, T. Spano, N. Cook, P. Burns, Rare-earth element fractionation in uranium ore and its U(VI) alteration minerals, Appl. Geochemistry. 87(Suppl. (2017) 84-92.

[7] S. Aranda, D. Borrok, R. Wanty, L. Balistrieri, Zinc isotope investigation of surface and pore waters in a mountain watershed impacted by acid rock drainage, Sci. Total Environ. 420 (2012) 202-213.

[8] W. J. Yang, K. B. Ding, P. Zhang, H. Qiu, C. Cloquet, H. J. Wen, J. L. Morel, R. L. Qiu, Y. T. Tang, Cadmium stable isotope variation in a mountain area impacted by acid mine drainage, Sci. Total Environ. 646 (2019) 696-703. doi:10.1016/j.scitotenv.2018.07.210.

[9] W. A. M. Fernando, I. M. S. K. Ilankoon, T. H. Syed, M. Yellishetty, Challenges and opportunities in the removal of sulphate ions in contaminated mine water: A review, Miner. Eng. 117 (2018) 74-90. doi:10.1016/j.mineng.2017.12.004.

[10] W. E. Olds, D. C. W. Tsang, P. A. Weber, C. G. Weisener, Nickel and zinc removal from acid mine drainage: Roles of sludge surface area and neutralising agents, J. Min. 2013 (2013) 5. doi:10.1155/2013/698031.

[11] E.-T. Tolonen, A. Sarpola, T. Hu, J. RdmO, U. Lassi, Acid mine drainage treatment using by-products from quicklime manufacturing as neutralization chemicals, Chemosphere. 117 (2014) 419-424. doi:http://dx.doi.org/10.1016/j.chemosphere.2014.07.090.

[12] T. Chen, B. Yana, C. Lei, X. Xiao, Pollution control and metal resource recovery for acid mine drainage, Hydrometall. 147-148 (2014) 112-119.

[13] H. M. Anawar, Sustainable rehabilitation of mining waste and acid mine drainage using geochemistry, mine type, mineralogy, texture, ore extraction and climate knowledge, J. Environ. Manage. 158 (2015) 111-121. doi:http://dx.doi.org/10.1016/j.jenvman.2015.04.045.

[14] J. Mulopo, Continuous pilot scale assessment of the alkaline barium calcium desalination process for acid mine drainage treatment, J. Environ. Chem. Eng. 3 (2015) 1295-1302. doi:http://dx.doi.org/10.1016/j.jece.2014.12.001.

[15] A. Vaněk, V. Ettler, K. Skipalová, J. Novotný, V. Penížek, M. Mihaljevič, O. Sracek, O. Drábek, V. Tejnecký, B. Mapani, Environmental stability of the processing waste from sulfide mining districts of Namibia—A model rhizosphere solution approach, J. Geochemical Explor. 144 (2013) 421-426. doi:10.1016/j.gexplo.2013.10.018.

[16] L. Nejeschlebová, O. Sracek, M. Mihaljevič, V. Ettler, B. Křibek, I. Knésl, A. Vaněk, V. Penížek, Z. Dolníček, B. Mapani, Geochemistry and potential environmental impact of the mine tailings at Rosh Pinah, southern Namibia, J. African Earth Sci. 105 (2015) 17-28. doi:http://dx.doi.org/10.1016/j.jafrearsci.2015.02.005.

[17] V. Masindi, E. Chatzisymeon, I. Kortidis, S. Foteinis, Assessing the sustainability of acid mine drainage (AMD) treatment in South Africa, Sci. Total Environ. 635 (2018) 793-802. doi:10.1016/j.scitotenv.2018.04.108.

[18] H. Shokrollahi, A review of the magnetic properties, synthesis methods and applications of maghemite, J. Magn. Magn. Mater. 426 (2017) 74-81. doi:10.1016/j.jmmm.2016.11.033.

[19] S. Kubickova, D. Niznansky, M. P. Morales Herrero, G. Salas, J. Vejpravova, Structural disorder versus spin canting in monodisperse maghemite nanocrystals, Appl. Phys. Lett. 104 (2014). doi:10.1063/1.4881331.

[20] K. K. Kefeni, T. M. Msagati, B. B. Mamba, Synthesis and characterization of magnetic nanoparticles and study their removal capacity of metals from acid mine drainage, Chem. Eng. J. 276 (2015) 222-231. doi:http://dx.doi.org/10.1016/j.cej.2015.04.066.

[21] K. K. Kefeni, T. A. M. Msagati, T. T. I. Nkambule, B. B. Mamba, Synthesis and application of hematite nanoparticles for acid mine drainage treatment, J. Environ. Chem. Eng. 6 (2018) 1865-1874. doi:10.1016/j.jece.2018.02.037.

[22] M. E. Mejia-Santillan, N. Pariona, J. Bravo-C., M. Herrera-Trejo, F. Montejo-Alvaro, A. Zarate, D. L. Perry, A. I. Mtz-Enriquez, Physical and arsenic adsorption properties of maghemite and magnetite sub-microparticles, J. Magn. Magn. Mater. 451 (2018) 594-601. doi:10.1016/j.jmmm.2017.11.111.

[23] M. Munoz, Z. M. De Pedro, J. A. Casas, J. J. Rodriguez, Preparation of magnetite-based catalysts and their application in heterogeneous Fenton oxidation—A review, "Applied Catal. B, Environ. 176-177 (2015) 249-265. doi:10.1016/j.apcatb.2015.04.003.

[24] J.-C. Lou, C.-K. Chang, Completely treating heavy metal laboratory waste liquid by an improved ferrite process, Sep. Purif. Technol. 57 (2007) 513-518. doi:http://dx.doi.org/10.1016/j.seppur.2006.11.005.

[25] A. Ali, H. Zafar, I. ul Haq, M. Zia, A. R. Phull, J. S. Ali, A. Hussain, Synthesis, characterization, applications, and challenges of iron oxide nanoparticles, Nanotechnol. Sci. Appl. 9 (2016) 49-67.

[26] S. Lin, D. Liu, Z. Liu, Removal of arsenic contaminants with magnetic γ-Fe2O3 nanoparticles, Chem. Eng. J. 211-212 (2012) 46-52.

[27] A. Roy, J. Bhattacharya, Removal of Cu(II), Zn(II) and Pb(II) from water using microwave-assisted synthesized maghemite nanotubes, Chem. Eng. J. 211-2012 (2012) 493-500.

[28] T. Tuutijärvi, J. Lu, M. Sillanpää, G. Chen, As (V) adsorption on maghemite nanoparticles, J. Hazard. Mater. 166 (2009) 1415-1420. doi:10.1016/j.jhazmat.2008.12.069.

[29] N. Jordan, A. Ritter, A. C. Scheinost, S. Weiss, D. Schild, R. Hu, Selenium(IV) Uptake by Maghemite (γ-$Fe_2O_3$), Environ. Sci. Technol. 14 (2014) 54-59.

[30] A. H. Lu, E. L. Salabas, F. Schuth, Magnetic Nanoparticles: Synthesis, Protection, Functionalization, and Application, Angew. Chem. Int. Ed. 46 (2007) 1222-1244.

[31] A. Afkhami, M. S. Tehrani, H. Bagheri, Modified maghemite nanoparticles asan efficient adsorbent for removing some cationic dyes from aqueous solution, Desalination. 263 (2010) 240-248.

[32] A. Etale, H. Tutu, D. C. Drake, Application of maghemite nanoparticles as sorbents for the removal of Cu(II), Mn(II) and U(VI) ions from aqueous solution in acid mine drainage conditions, Appl. Water Sci. 6 (2014) 187-197. doi:10.1007/s13201-014-0217-3.

[33] A. Afkhami, R. Moosavi, Adsorptive removal of Congo red, a carcinogenic textile dye, from aqueous solutions by maghemite nanoparticles, J. Hazard. Mater. 174 (2010) 398-403. doi:10.1016/j.jhazmat.2009.09.066.

[34] F. B. Shahri, A. Niazi, Synthesis of modified maghemite nanoparticles and its application for removal of Acridine orange from aqueous solutions by using Box-Behnken design, J. Magn. Magn. Mater. 396 (2015) 318-326. doi:http://dx.doi.org/10.1016/j.jmmm.2015.08.054.

[35] R. Akhbarizadeh, M. R. Shayestefar, E. Darezereshki, Competitive removal of metals from wastewater by maghemite nanoparticles: A comparison between simulated wastewater and AMD, Mine Water Environ. 33 (2014) 89-96. doi:10.1007/s10230-013-0255-3.

[36] M. Mozaffari, S. Shatooti, M. Jafarzadeh, M. Niyaifar, A. Aftabi, H. Mohammadpour, S. Amiri, Synthesis of Zn2+ substituted maghemite nanoparticles and investigation of their structural and magnetic properties, J. Magn. Magn. Mater. 382 (2015) 366-375. doi:http://dx.doi.org/10.1016/j.jmmm.2015.01.087.

[37] K. L. Pisane, E. C. Despeaux, M. S. Seehra, Magnetic relaxation and correlating effective magnetic moment with particle size distribution in maghemite nanoparticles, J. Magn. Magn. Mater. 384 (2015) 148-154. doi:http://dx.doi.org/10.1016/j.jmmm.2015.02.038.

[38] M. Anantharaman, K. Malini, P. Sindhu, S. Sindhu, H. V Keer, Influence of dopants on the properties of maghemite, Indian J. Pure Appl. Phys. 37 (1999) 42-47.

[39] W. Jiang, M. Pelaez, D. D. Dionysiou, M. H. Entezari, D. Tsoutsou, K. O'shea, Chromium(VI) removal by maghemite nanoparticles, Chem. Eng. J. 222 (2013) 527-533.

[40] N. Ferroudj, J. Nzimoto, A. Davidson, D. Talbot, E. Briot, V. Dupuis, A. Bée, M. S. Medjram, S. Abramson, Maghemite nanoparticles and maghemite/silica nanocomposite microspheres as magnetic Fenton catalysts for the removal of water pollutants, Appl. Catal. B Environ. 136-137 (2013) 9-18. doi:10.1016/j.apcatb.2013.01.046.

[41] K. K. Kefeni, B. B. Mamba, T. A. M. Msagati, Magnetite and cobalt ferrite nanoparticles used as seeds for acid mine drainage treatment, J. Hazard. Mater. 333 (2017) 308-318. doi:10.1016/j.jhazmat.2017.03.054.

[42] W. Kim, C. Y. Suh, S. W. Cho, K. M. Roh, H. Kwon, K. Song, I. J. Shon, A new method for the identification and quantification of magnetite-maghemite mixture using conventional X-ray diffraction technique, Talanta. 94 (2012) 348-352. doi:10.1016/j.talanta.2012.03.001.

[43] S. Yoon, Preparation and Physical Characterizations of Superparamagnetic Maghemite Nanoparticles, J. Magn. 19 (2014) 323-326.

[44] H. Hernández-Flores, N. Pariona, M. Herrera-Trejo, H. M. Hdz-García, A. I. Mtz-Enriquez, Concrete/maghemite nanocomposites as novel adsorbents for arsenic removal, J. Mol. Struct. 1171 (2018) 9-16. doi:10.1016/j.molstruc.2018.05.078.

[45] A. A. El-Bellihi, Kinetics of thermal decomposition of iron carbonate, Egypt J. Chem. 53 (2010) 871-884.

[46] S. Mhlongo, P. T. Mativenga, A. Mamewick, Water quality in a mining and water-stressed region, J. Clean. Prod. 171 (2018) 446-456. doi:10.1016/j.jclepro.2017.10.030.

[47] R. R. Marcello, S. Galato, M. Peterson, H. G. Riella, A. M. Bemardin, Inorganic pigments made from the recycling of coal mine drainage treatment sludge, J. Environ. Manage. 88 (2008) 1280-1284. doi:http://dx.doi.org/10.1016/j.jenvman.2007.07.005.

[48] V. Masindi, A novel technology for neutralizing acidity and attenuating toxic chemical species from acid mine drainage using cryptocrystalline magnesite tailings, J. Water Process Eng. 10 (2016) 67-77. doi:10.1016/j.jwpe.2016.02.002.

[49] C. M. Neculita, E. Rosa, A review of the implications and challenges of manganese removal from mine drainage, Chemosphere. 214 (2019) 491-510. doi:10.1016/j.chemosphere.2018.09.106.

[50] S. R. Chowdhury, E. K. Yanful, Arsenic and chromium removal by mixed magnetite-maghemite nanoparticles and the effect of phosphate on removal, J. Environ. Manage. 91 (2010) 2238-2247. doi:10.1016/j.jenvman.2010.06.003.

[51] T. Tuutijtrvi, J. Lu, M. Sillanpaa, G. Chen, Adsorption mechanism of arsenate on crystal γ-Fe2O3 nanoparticles, J. Environ. Eng. 136 (2010) 897-905.

[52] M. Zhang, B. Zhang, X. Li, Z. Yin, X. Guo, Synthesis and surface properties of submicron barium sulfate particles, Appl. Surf. Sci. 258 (2011) 24-29. doi:10.1016/j.apsusc.2011.07.137.

[53] H. Runtti, P. Tynjälä, S. Tuomikoski, T. Kangas, T. Hu, J. Rämö, U. Lassi, Utilisation of barium-modified analcime in sulphate removal: Isotherms, kinetics and thermodynamics studies, J. Water Process Eng. 16 (2017) 319-328. doi:10.1016/j.jwpe.2016.11.004.

[54] J. Kiefer, A. Strk, A. L. Kiefer, H. Glade, Infrared spectroscopic analysis of the inorganic deposits from water in domestic and technical heat exchangers, Energies. 11 (2018). doi:10.3390/en11040798.

[55] L. Deng, Z. Shi, X. Peng, Adsorption of Cr(VI) onto a magnetic CoFe2O4/MgAl-LDH composite and mechanism study, RSC Adv. 5 (2015) 49791-49801. doi:10.1039/C5RA06178D.

[56] S. J. Iyengar, M. Joy, K. Ghosh, S. Dey, Magnetic, X-ray and Mossbauer studies on magnetite/maghemite core-shell nanostructures fabricated through an aqueous route, RSC Adv. 4 (2014) 64919-64929. doi:10.1039/c4ra11283k.

[57] Á. B. Sifontes, E. Cañizales, J. Toro-mendoza, E. Ávila, P. Hernández, B. A. Delgado, G. B. Gutiérrez, Y. Díaz, E. Cruz-barrios, Obtaining Highly Crystalline Barium Sulphate Nanoparticles via Chemical Precipitation and Quenching in Absence of Polymer Stabilizers, J. Nanomater. 2015 (2015).

[58] A. Jafari, S. Farjami Shayesteh, M. Salouti, K. Boustani, Effect of annealing temperature on magnetic phase transition in Fe3O4 nanoparticles, J. Magn. Magn. Mater. 379 (2015) 305-312. doi:10.1016/j.jmmm.2014.12.050.

[59] H. I. Adegoke, F. AmooAdekola, O. S. Fatoki, B. J. Ximba, Adsorption of Cr(VI) on synthetic hematite ($\alpha$-Fe2O3) nanoparticles of different morphologies, Korean J. Chem. Eng. 31 (2014) 142-154. doi:10.1007/s11814-013-0204-7.

[60] M. Gotić, G. Dražić, S. Musić, Hydrothermal synthesis of $\alpha$-Fe2O3 nanorings with the help of divalent metal cations, Mn2+, Cu2+, Zn2+ and Ni2+, J. Mol. Struct. 993 (2011) 167-176. doi:10.1016/j.molstruc.2010.12.063.

[61] P. Ayala-parra, R. Sierra-alvarez, J. A. Field, Treatment of acid rock drainage using a sulfate-reducing bioreactor with zero-valent iron, J. Hazard. Mater. 308 (2016) 97-105. doi:10.1016/j.jhazmat.2016.01.029.

[62] A. Kumar, C. Guo, G. Sharma, D. Pathania, M. Naushad, S. Kalia, P. Dhiman, Magnetically recoverable ZrO2/Fe3O4/chitosan nanomaterials for enhanced sunlight driven photoreduction of carcinogenic Cr(VI) and dechlorination and mineralization of 4-chlorophenol from simulated waste water, RSC Adv. 6 (2016) 13251-13263.

[63] Y. Yang, J. Liu, B. Zhang, F. Liu, Mechanistic studies of mercury adsorption and oxidation by oxygen over spinel-type MnFe2O4, J. Hazard. Mater. 321 (2017) 154-161. doi:10.1016/j.jhazmat.2016.09.007.

[64] T. V. Rakotonimaro, C. M. Neculita, B. Bussière, M. Benzaazoua, G. J. Zagury, Recovery and reuse of sludge from active and passive treatment of mine drainage-impacted waters: a review, Environ. Sci. Pollut. Res. 24 (2017) 73-91. doi:10.1007/s11356-016-7733-7.

[65] M. J. Ryan, A. D. Kney, T. L. Carley, A study of selective precipitation techniques used to recover refined iron oxide pigments for the production of paint from a synthetic acid mine drainage solution, Appl. Geochemistry. 79 (2017) 27-35. doi:10.1016/j.apgeochem.2017.01.019.

[66] L. Mei, A. Iizuka, E. Shibata, Recent Progress on Utilization of Metal-Rich Wastes in Ferrite Processing: A Review, Waste and Biomass Valorization. 9 (2018) 1669-1679. doi:10.1007/s12649-017-9909-x.

[67] M. Mondekovd, R. Novotný, J. Koplík, L. Kalina, V. Bilek, F. Šoukal, Hexavalent Chromium Reduction by Ferrous Sulphate Heptahydrate Addition into the Portland Clinker, Procedia Eng. 151 (2016) 73-79. doi:10.1016/j.proeng.2016.07.382.

The invention claimed is:

1. A process for treating acid mine drainage (AMD) comprising the following steps:
1. providing an AMD having a pH 5 2 and comprising sulphate ions in a concentration of greater than 9000 mg/L, iron ions in a concentration of greater than 2000 mg/L, cobalt ions, copper ions, manganese ions, nickel ions, and zinc ions;
2. adjusting the pH of the AMD to be in the range of 3 to about 5 with a base;
3. adding maghemite nanoparticles to the AMD in step 2) to form a slurry; and
4. a) aerating the slurry obtained in step 3), or
   b) heating at a temperature of 50° C. to 70° C. and mixing the slurry obtained in step 3); and
5. separating from the slurry, a solution and maghemite nanoparticles loaded with one or more metals and sulphate and precipitated metals;
wherein:
the solution produced according to the process comprises sulphate, cobalt, copper, manganese, nickel, and zinc ions in concentrations lower than those of the AMD prior to the process; and
the process removes about 80% to 100% of the copper ions, about 20% to about 88% of the manganese ions, about 60% to about 98% of the cobalt ions, about 40% to about 98% of the zinc ions, and about 40% to about 96% of the nickel ions from the AMD.

2. The process of claim 1, wherein the AMD further comprises aluminum, arsenic, calcium, chromium, magnesium, sodium, lead and antimony ions.

3. The process of claim 2, wherein the metals removed from the AMD are aluminum, arsenic, calcium, chromium, cobalt, copper, iron, magnesium, manganese, sodium, nickel, lead, antimony and zinc ions.

4. The process of claim 1, wherein, at step 2, the pH of the AMD is adjusted in the range of 4 to about 5.

5. The process of claim 4, wherein, at step 2, the pH of the AMD is adjusted to about 5.

6. The process of claim 1, wherein the base is magnesium bicarbonate, magnesium oxide, sodium hydroxide or ammonium hydroxide.

7. The process of claim 6, wherein the base is 25% ammonium hydroxide solution.

8. The process of claim 1, wherein, at step 4 a), the AMD is aerated using compressed air or pure oxygen.

9. The process of claim 1 wherein, at step 4 b), the AMD is heated to a temperature of about 60° C.

10. The process of claim 1, wherein, at step 4 b), the AMD is mixed in a mixer at a speed of 200 to 300 rpm.

11. The process of claim 10, wherein, at step 4 b), the AMD is mixed in a mixer at a speed of about 250 rpm.

12. The process of claim 1, wherein, at step 5, (i) the solution and maghemite nanoparticles and precipitated metals are separated via filtration or (ii) precipitated metals and maghemite nanoparticles are separated by decantation from the solution.

13. The process of claim 1, wherein separated maghemite nanoparticles loaded with one or more metals and sulphate obtained in step 5 are stabilized by calcination.

14. The process of claim 1, wherein the maghemite nanoparticles are synthesized by contacting an industrial magnetite with air or sintering magnetite obtained from the AMD.

15. The process of claim 14, wherein the sintering takes place at about 150° C. to about 250° C. under aeration for 3 to 6 hours.

16. The process of claim 1, wherein a mass ratio of maghemite:Fe in the AMD is from about 1:2 to 1:1.

17. The process of claim 16, wherein the mass ratio of maghemite:Fe in the AMD is about 1:2.

18. The process of claim 1, wherein the heating and mixing in step 4 b) occurs for at least 2 hours.

19. The process of claim 1, wherein the sulphate ions and one or more metal ions are removed from the AMD simultaneously.

20. The process of claim 1, wherein
   (i) the slurry produced at step 3 comprises one or more precipitated metals, maghemite, one or more metals and sulphate that is precipitated in a sludge/slurry; or
   (ii) the slurry produced at step 3 comprises at least one or more precipitated metals, one or more metals and sulphate adsorbed on the surface of the maghemite; or
   (iii) the slurry produced at step 3 comprises the one or more precipitated metals and sulphate incorporated into the maghemite or sludge/slurry.

21. The process of claim 1, wherein the solution separated at step 5 comprises water and lower concentration of sulphate and metals not removed from the AMD.

22. The process of claim 21, wherein the metals not removed from the AMD include calcium and magnesium metal ions.

23. The process of claim 21, wherein sulphate residue left after treatment is removed by using soluble salts of barium or barium hydroxide in the form of barium sulphate precipitate without any pH change.

\* \* \* \* \*